(12) United States Patent
Gorin et al.

(10) Patent No.: US 11,620,659 B2
(45) Date of Patent: Apr. 4, 2023

(54) SYSTEM AND METHOD FOR APPLYING IMAGE RECOGNITION AND INVISIBLE WATERMARKING TO MITIGATE AND ADDRESS FRAUD

(71) Applicant: JPMorgan Chase Bank, N.A., New York, NY (US)

(72) Inventors: Neil Gorin, New York, NY (US); Deborah Atta-Fynn, Bear, DE (US); George Tidwell, Columbus, OH (US); Daniel Stiving, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 17/104,118

(22) Filed: Nov. 25, 2020

(65) Prior Publication Data

US 2021/0158374 A1 May 27, 2021

Related U.S. Application Data

(60) Provisional application No. 63/010,192, filed on Apr. 15, 2020, provisional application No. 62/940,314, filed on Nov. 26, 2019.

(51) Int. Cl.
*G06Q 30/00* (2012.01)
*G06F 40/30* (2020.01)
*G06K 7/14* (2006.01)
*G06K 19/06* (2006.01)
*G06Q 50/00* (2012.01)
(Continued)

(52) U.S. Cl.
CPC ......... *G06Q 30/0185* (2013.01); *G06F 16/53* (2019.01); *G06F 21/16* (2013.01); *G06F 40/30* (2020.01); *G06K 7/1417* (2013.01); *G06K 7/1447* (2013.01); *G06K 19/06037* (2013.01); *G06Q 10/10* (2013.01); *G06Q 50/01* (2013.01);
(Continued)

(58) Field of Classification Search
CPC .............. G06K 7/1417; G06K 7/1447; G06K 19/06037; G06F 16/53
See application file for complete search history.

(56) References Cited

U.S. PATENT DOCUMENTS 5,444,840 A 8/1995 Froessl
2011/0314550 A1 12/2011 Mastrangelo et al.
(Continued)

OTHER PUBLICATIONS

Notification of Transmittal of the International Search Report and The Written Opinion of the International Searching Authority issued in PCT /US2020/062143 dated Mar. 24, 2021.

*Primary Examiner* — Laura A Gudorf
(74) *Attorney, Agent, or Firm* — Greenblum & Bernstein, P.L.C.

(57) ABSTRACT

An embodiment of the present invention is directed to utilizing image recognition technology to identify discussions and images of exposed customer information indicating compromise, site vulnerabilities, or documents on forums and social media platforms. An embodiment of the present invention is directed to utilizing invisible watermarking of digital bank statements to identify specific customers with exposed information indicating compromise, or reporting site vulnerabilities. An embodiment of the present invention is directed to including an identifier, e.g., token/beacon, that may be traced back to a compromised customer. The actual location of the QR code/beacon may be randomized.

20 Claims, 5 Drawing Sheets

(51) Int. Cl.
*G06Q 10/10* (2012.01)
*G06F 16/53* (2019.01)
*G06F 21/16* (2013.01)
*G06V 10/40* (2022.01)
*G06V 30/40* (2022.01)
*G06V 30/10* (2022.01)
*G06Q 30/018* (2023.01)

(52) U.S. Cl.
CPC .............. *G06V 10/40* (2022.01); *G06V 30/40* (2022.01); *G06V 30/10* (2022.01)

(56) References Cited

U.S. PATENT DOCUMENTS

| | | |
|---|---|---|
| 2015/0348043 A1 | 12/2015 | Leger |
| 2017/0053369 A1 | 2/2017 | Gottschalk, Jr. et al. |
| 2019/0222602 A1 | 7/2019 | Linder |
| 2019/0349351 A1* | 11/2019 | Verma .................... G06F 21/552 |

* cited by examiner

Total $9,067.66

Personal

▼ CREDIT CARDS & PRODUCTS   Current balance

CREDIT CARD (...7171)            $5,555.55

CREDIT CARD (...1616)            $0.00
                                 310

CREDIT CARD (...2222)            $3,972.23
                                 Current balance

CREDIT CARD (...2222)                                                    Things you can do >

Current balance ⓘ      Available credit       Ultimate Rewards      5% cash back ⓘ
$3,972.23              $23,370.59             4,363 pts             Not activated
                       Transfer a balance >   Redeem >              (Jul-Sep) Activate >

Next payment due       Minimum payment due ⓘ  Balance on last statement
Jun 27, 2019       $25.00                 $1,834.57

Automatic payment is Off.  Set up autopay >

[ Pay card ]          [ Statements ]          [ Paperless ]

⦿ EXCLUSIVE OFFER    Earn up to $2,000 bonus cash back
                     You've worked hard to grow your business. Go further with the Business Unlimited Plus earn
                     unlimited 2.5% cash back on every purchase.
                     Apply now >

▼ PENDING (3)                                        Pending charges $155.55 ⓘ

| Date | Description | Amount |
|---|---|---|
| Jun 17, 2019 | GAS STATION | $18.88 |
| Jun 15, 2019 | FURNITURE STORE | $21.11 |

Account benefits

Ultimate Rewards ⓘ          4,444
Use your points             Total points

SYSTEM AND METHOD FOR APPLYING IMAGE RECOGNITION AND INVISIBLE WATERMARKING TO MITIGATE AND ADDRESS FRAUD

CROSS REFERENCE TO RELATED APPLICATIONS

This application relates to U.S. Provisional Application 62/940,314, entitled "System and Method for Applying Image Recognition to Mitigate and Address Fraud," filed Nov. 26, 2019, and U.S. Provisional Application 63/010,192, entitled "System and Method for Applying Invisible Watermarking of Digital Bank Statements to Mitigate and Address Fraud," filed Apr. 15, 2020, the contents of which are incorporated herein in their entirety.

FIELD OF THE INVENTION

The invention relates generally to a system and method for implementing image recognition including invisible watermarking to quickly identify potential victims of exposed customer information that could be exploited for fraud.

BACKGROUND OF THE INVENTION

Customer credentials may be exposed online and offered for sale by malicious actors. These bad actors may disseminate images of compromised customer online profiles to demonstrate their access to the customer's funds in order to sell credentials for financial gain. The images may include most recent transactions, partial account numbers, balance data and a date of image capture. In addition, customers may disseminate images of their own online profile to demonstrate vulnerabilities within the platform, or to point out site errors that have inadvertently given them access to information beyond the scope of their profile. Identifying compromised customer credentials on the Internet requires significant manual work and resources. Attempts to detect posts with this information using key word matching is highly unreliable due to language translations, slang, and high false positive rates.

In a similar manner, identifying the true customer behind compromised customer credentials exposed on the Internet can be a tedious manual process. Attempts to find customer based only on a balance and partial account number can help to narrow the pool of potential accounts, but common balances and unclear date ranges can make identification of victims nearly impossible, thereby hindering the ability of banks, financial institutions and other providers to adequately protect their clients.

These and other drawbacks exist.

SUMMARY OF THE INVENTION

According to an embodiment, the invention relates to a system that implements image recognition to mitigate fraud and identify victims of fraudulent activity and submitters of customer-identified site vulnerabilities. The system comprises: a data store that manages a catalog of images extracted from one or more external sources; and an image recognition tool comprising a scanning component and a computer processor and further coupled to the data store and programmed to perform the steps of: scanning, via the scanning component, one or more images that are attributable to an entity; extracting forum and post metadata details from the one or more images, wherein the metadata details comprises one or more of: corresponding website, a date and time posted and poster identifier; extracting customer information, wherein the customer information comprises one or more of: customer identifier, account identifier, balance and a recent transaction; determining whether the customer information is attributable to a valid customer; and determining whether there is a fraud risk for the customer.

According to another embodiment, the invention relates to a method that implements image recognition to mitigate fraud and identify victims of fraudulent activity and submitters of customer-identified site vulnerabilities. The method comprises the steps of: scanning, via an image recognition tool, one or more images that are attributable to an entity; extracting forum and post metadata details from the one or more images, wherein the metadata details comprises one or more of: corresponding website, a date and time posted and poster identifier; extracting customer information, wherein the customer information comprises one or more of: customer identifier, account identifier, balance and a recent transaction; determining whether the customer information is attributable to a valid customer; and determining whether there is a fraud risk for the customer.

According to yet another embodiment, the invention relates to a method that implements image recognition to mitigate fraud and identify victims of fraudulent activity and submitters of customer-identified site vulnerabilities. The system comprises: a data store that manages tokens that track activity; and a computer processor, coupled to the data store, programmed to perform the steps of: identifying an exposed online profile; identifying a specific customer associated with the exposed online profile, wherein the exposed online profile relates to an electronic statement; scanning at least part of the electronic statement wherein the electronic statement comprises an embedded token that is substantially undetectable; extracting the embedded token from the at least part of the electronic statement wherein a location of the embedded token in the electronic statement is randomized; and based on the customer identified by the embedded token, determining an associated fraud risk.

The system may include a specially programmed computer system comprising one or more computer processors, interactive interfaces, electronic storage devices, and networks. The computer implemented system and method described herein provide unique advantages to entities, clients, customers and other participants, according to various embodiments of the invention. With an embodiment of the present invention, customer identity and other sensitive information may be protected from fraud and misuse. By applying image recognition based on an entity logo, font and other unique formatting characteristics, an embodiment of the present invention may detect when images of customer screenshots and login pages are being exposed. This may be relevant when a true customer is exposing a site vulnerability and shares an image of the customer's account, along with sensitive information. This may also apply when a bad actor attempts to sell credentials and use customer account images to confirm authenticity and value. In such situations, a text or word search would not sufficiently identify a customer's login screenshot, for example. This solution is particularly useful to vendors who monitor criminal underground forums.

In addition, by embedding an invisible watermark on segments of a client's online profile pertaining to their accounts, an embodiment of the present invention may detect the identity of an exposed customer when images of financial account screenshots and login pages are being posted and shared. This may apply when a true customer is exposing a site vulnerability or if a bad actor is attempting to sell credentials. Oftentimes, dates and specific transactions are not included, making individual-level association with the image difficult to impossible. This solution is particularly useful to financial institutions offering online access to account activity.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to utilizing image recognition technology to identify discussions and images showing compromised customers, vulnerabilities, and/or documents on forums and social media platforms, e.g., Deep dark web (DDW) forums, Reddit.com, Twitter, etc. An embodiment of the present invention is directed to improving identification of compromised customers and customer discussions on the Internet. Once a conversation is identified, natural language processing (NLP) may be used to determine context regarding the image. Further image recognition may extract other relevant customer information. These enhancements seek to expedite remediation of compromised customer accounts and/or vulnerabilities. An embodiment of the present invention may be used as a standalone image recognition solution. Other variations and implementations may be realized. According to another embodiment, the image recognition system may be used with a text and/or keyword search.

In addition, an embodiment of the present invention is directed to utilizing invisible watermarking technology to identify the exact identity of compromised customers, or customers reporting vulnerabilities on forums and social media platforms, e.g., Deep dark web (DDW) forums, Reddit.com, Twitter, etc. These enhancements seek to expedite remediation of compromised customer accounts as well as enhance identification of vulnerabilities. According to another embodiment, the invisible watermarking may be used in conjunction with an image recognition system to proactively search for watermarks and/or other indicia.

Figure 1:
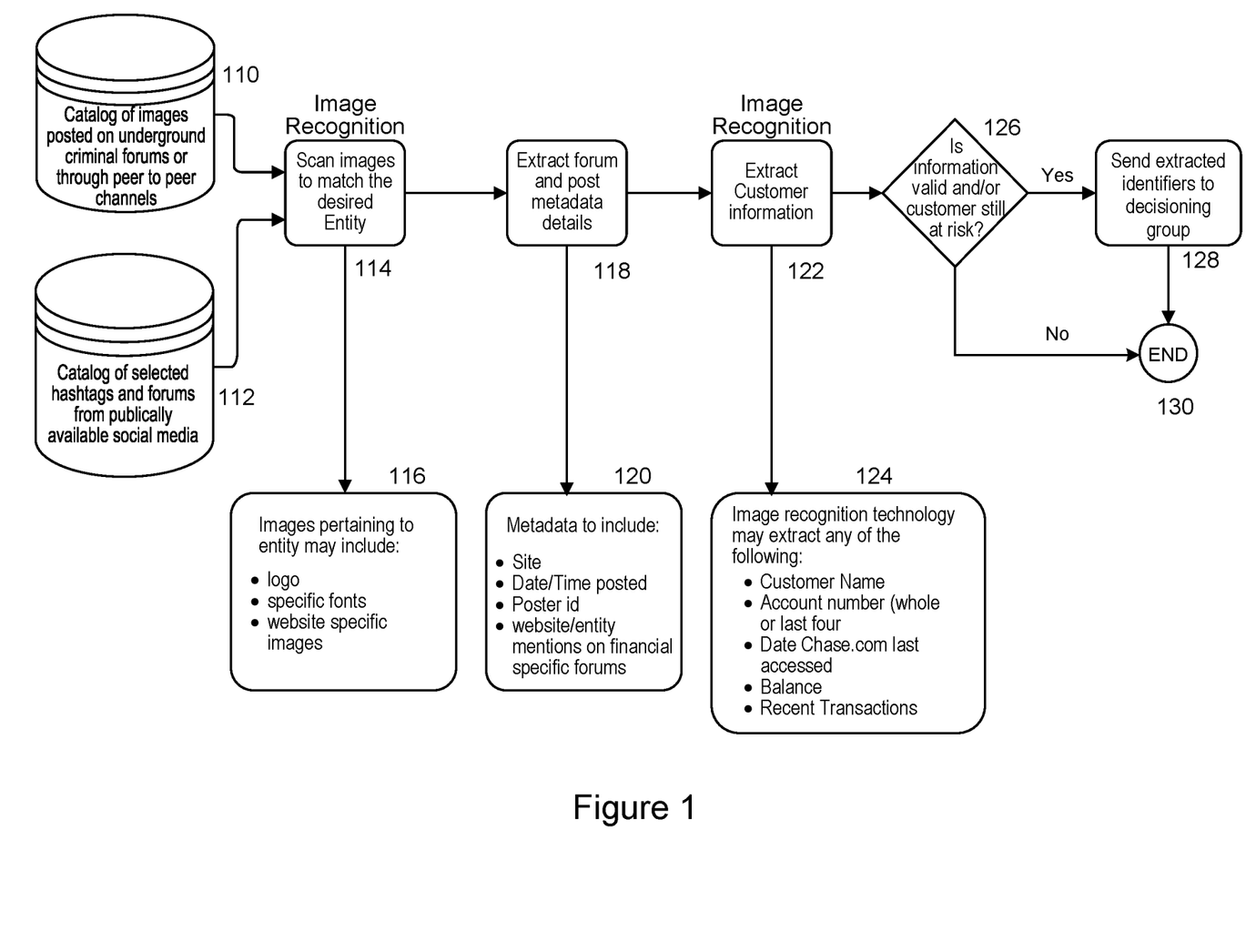
FIG. 1 is an exemplary process flow, according to an embodiment of the present invention.

FIG. 1 is an exemplary process flow, according to an embodiment of the present invention. At step 110, a catalog of images posted on underground criminal forums or through peer to peer channels may be maintained. At 112, a catalog of selected hashtags and forums from publically available social media sites may be maintained. At step 114, image recognition may be applied. As shown by 116, images may include a logo, specific fonts, specific images, layout and other distinguishing marks or images that are attributable to an entity, e.g., financial institution, bank, merchant, service provider, brand, etc. At step 118, forum and post metadata details may be extracted. As shown by 120, metadata may include site, data/time posted, poster identifier, entity mentions on financial specific forums. At step 122, customer information may be extracted. As shown by 124, image recognition may extract various forms of data, including customer name, account number (partial or whole), date website was last accessed, balance, recent transactions, etc. At step 126, an embodiment of the present invention may determine whether information is valid and/or whether the customer is at risk. If yes, extracted identifiers may be sent to a decisioning group at step 128. Otherwise, the process may end at step 130. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details of each step may be provided below.

At step 110, a catalog of images posted on underground criminal forums or through peer to peer channels may be maintained. An image may include a screenshot or other screen capture of an account page or other image that contains customer and/or account information, including personally identifiable information (PII). PII may include name, address, social security number, telephone number, email address, etc.

According to an embodiment of the present invention, an image may include an identifier, e.g., token/beacon, that may be used to trace back to a compromised customer. This enables an entity to read or scan a beacon in an image manually discovered and find an impacted customer.

At 112, a catalog of selected hashtags and forums from publically available social media sites may be maintained. Social media sites may include Twitter, Reddit, GitHub, etc. Other public information from various sources may be maintained.

At step 114, image recognition may be applied. This may involve scanning images to match a desired entity. The entity may include a merchant, service provider, financial institution, government entity, individual, etc. For example, this may involve identifying an image or screenshot as relating to a specific entity (e.g., bank, financial institution, etc.).

As shown by 116, images may include a logo, specific fonts, specific images, color, pattern, layout and other distinguishing marks or indicia that may be attributable to an entity, e.g., financial institution brand, etc.

At step 118, forum and post metadata details may be extracted. This may include forum details concerning a source, social media platform, etc. For example, details may be extracted from text on a webpage.

As shown by 120, metadata may include site, data/time posted, poster identifier, entity mentions on financial specific forums. Other information may be captured.

At step 122, customer specific information may be extracted. This may be part of the image recognition process. The images and/or extracted information may be associated with a specific customer or user. For example, an image may include a screenshot of an account page that includes various information including the last four numbers of the account, partial name or identifier, time/date stamp, current balance, last transactions, etc. An embodiment of the present invention may then associate the image and/or extracted information with a customer, client or other user.

As shown by 124, image recognition may extract various forms of data, including customer name, account number (partial or whole), date website was last accessed, balance, recent transactions, etc.

At step 126, an embodiment of the present invention may determine whether information is valid and/or customer is at risk. If yes, extracted identifiers may be sent to a decisioning group at step 128. This may involve a remediation solution, involvement from risk or fraud operations team, advising the Line of Business of site vulnerability, etc. The decisioning group may reset credentials, issue a new card product or account and/or perform other action.

Otherwise, the process may end at step 130.

An embodiment of the present invention is directed to including an identifier, e.g., token/beacon, that may be used to trace back to a compromised customer. The actual location of the QR code/beacon may be randomized. For example, a digital banking statement may have one or more QR codes/beacons embedded in a decimal point, text, logo, character or a portion of a character in a manner that is undetectable (or invisible) to a viewer. An embodiment of the present invention may use the embedded QR code/beacon to determine whether an identified banking statement has been fraudulently captured or whether there is risk associated with the underlying account. Other determinations relating to fraud and/or risk may be applied.

An embodiment of the present invention is directed to embedding a token within web pages and/or mobile applications to detect an action. For example, when a screenshot is taken, the token in the image is also captured. For example, a bad actor may access a customer's computer or malware on a mobile phone. In this example, the malware may take a screenshot from the user's actual device. An embodiment of the present invention may embed a token (e.g., beacon pixel, etc.) that is captured with that screenshot. This assists in tracking and identifying compromised accounts and customers. The token may include a beacon pixel and/or other similar tracking mechanism, including a web beacon and other variations (e.g., web bug, tracking bug, tag, web tag, page tag, tracking pixel, 1×1 GIF, clear GIF, etc.). Beacon pixels and other variations invisibly and unobtrusively enable tracking of content as well as online behavior and actions of various users.

An embodiment of the present invention may be implemented with the image recognition innovation described in FIG. 1. According to another embodiment, the beacon/token may be implemented as a stand-alone system separate from the process of FIG. 1. Other variations may be realized.

Figure 2:
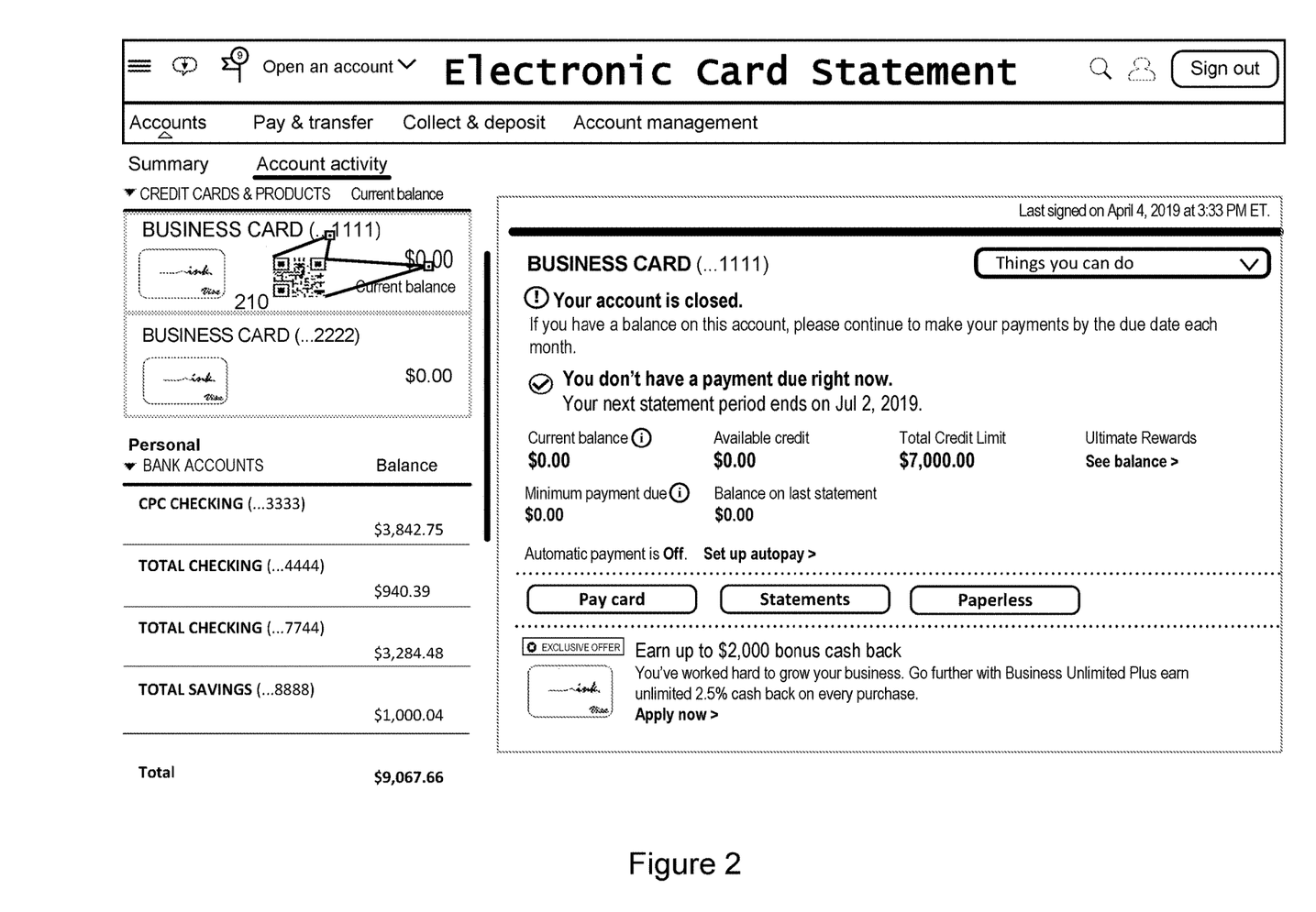
FIG. 2 is an exemplary user interface with an embedded token, according to an embodiment of the present invention.
Figure 3:
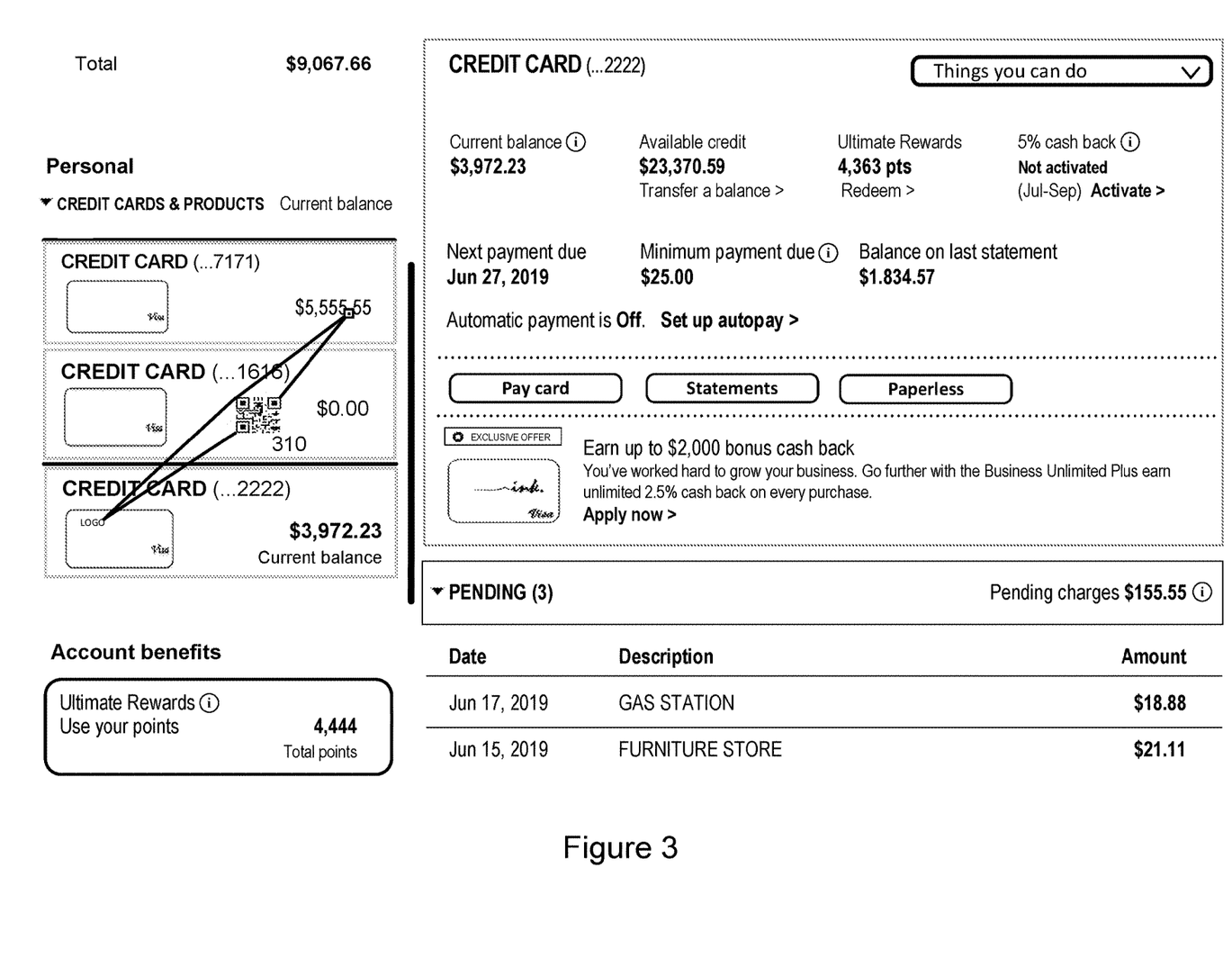
FIG. 3 is an exemplary user interface with an embedded token, according to an embodiment of the present invention.
Figure 4:
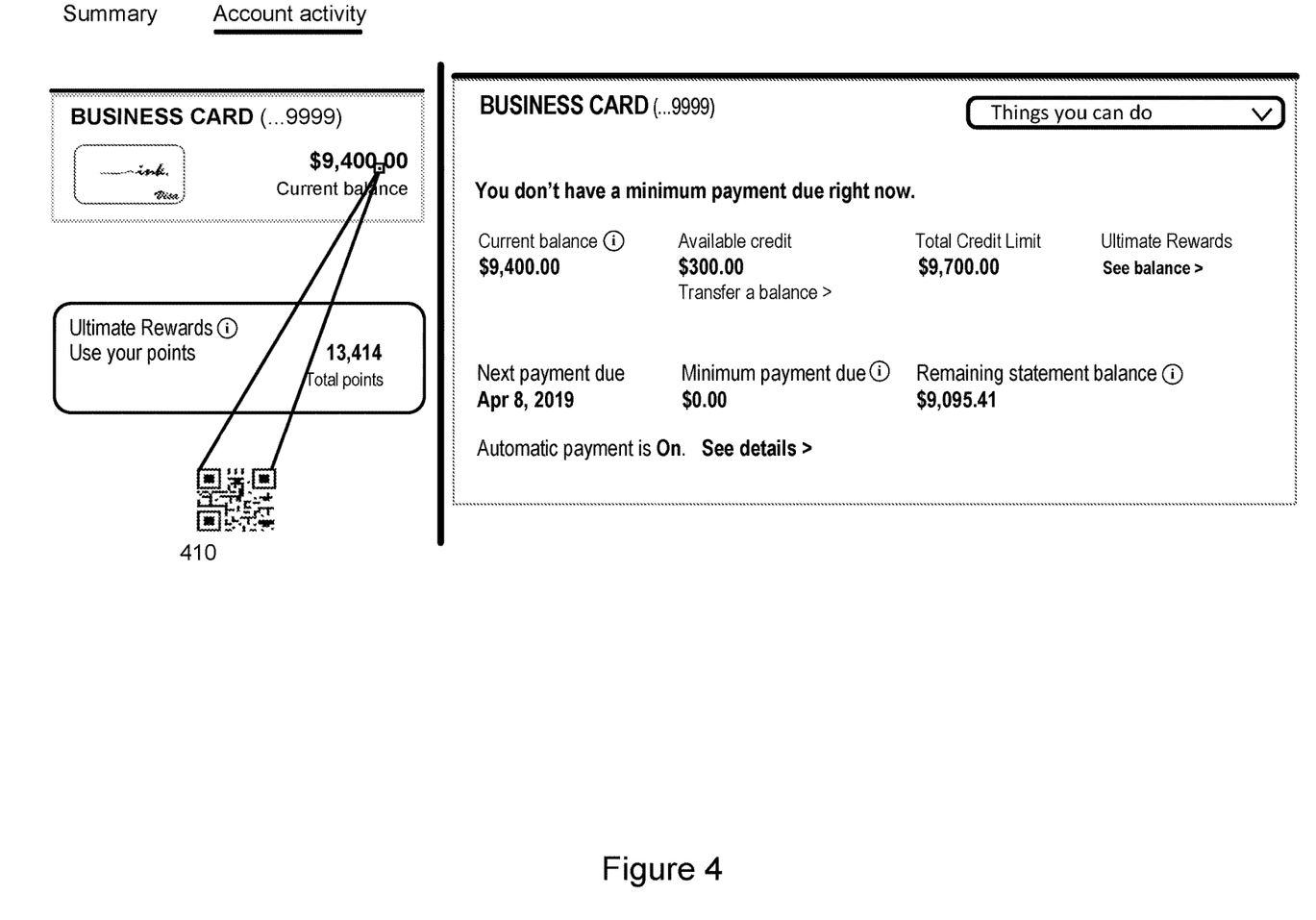
FIG. 4 is an exemplary user interface with an embedded token, according to an embodiment of the present invention.

FIGS. 2-4 represent examples of customer profiles posted online by malicious actors selling credentials. FIG. 2-4 demonstrate different ways actors may crop out information on the web page. The potential locations for a beacon/QR code are shown in boxes.

FIG. 2 is an exemplary user interface with an embedded token, according to an embodiment of the present invention. FIG. 2 represents an exemplary electronic credit card statement. An exemplary QR code 210 may be embedded in the card number and/or current balance. In this example, the same QR code may be embedded in multiple places. According to another example, different codes may be embedded in different places. Other variations may be applied.

FIG. 3 is an exemplary user interface with an embedded token, according to an embodiment of the present invention. FIG. 3 represents an exemplary electronic statement. In this example, a QR code 310 is embedded in the credit card balance and/or credit card logo.

FIG. 4 is an exemplary user interface with an embedded token, according to an embodiment of the present invention. FIG. 4 represents an exemplary electronic statement. In this example, a QR code 410 is embedded in the credit card balance.

According to an embodiment of the present invention, placement of the QR code may be randomized. The electronic statement may include a single QR code as well as multiple QR codes in an electronic statement or interface. Other variations may be applied based on factors, including risk, for example. For customer with a higher risk, multiple QR codes may be applied to ensure inclusion in a partial screen capture. While a QR code is shown in FIGS. 2-4, other tokens and/or beacons may be applied. Also, an electronic statement may include multiple forms and variations of tokens and/or beacons.

Figure 5:
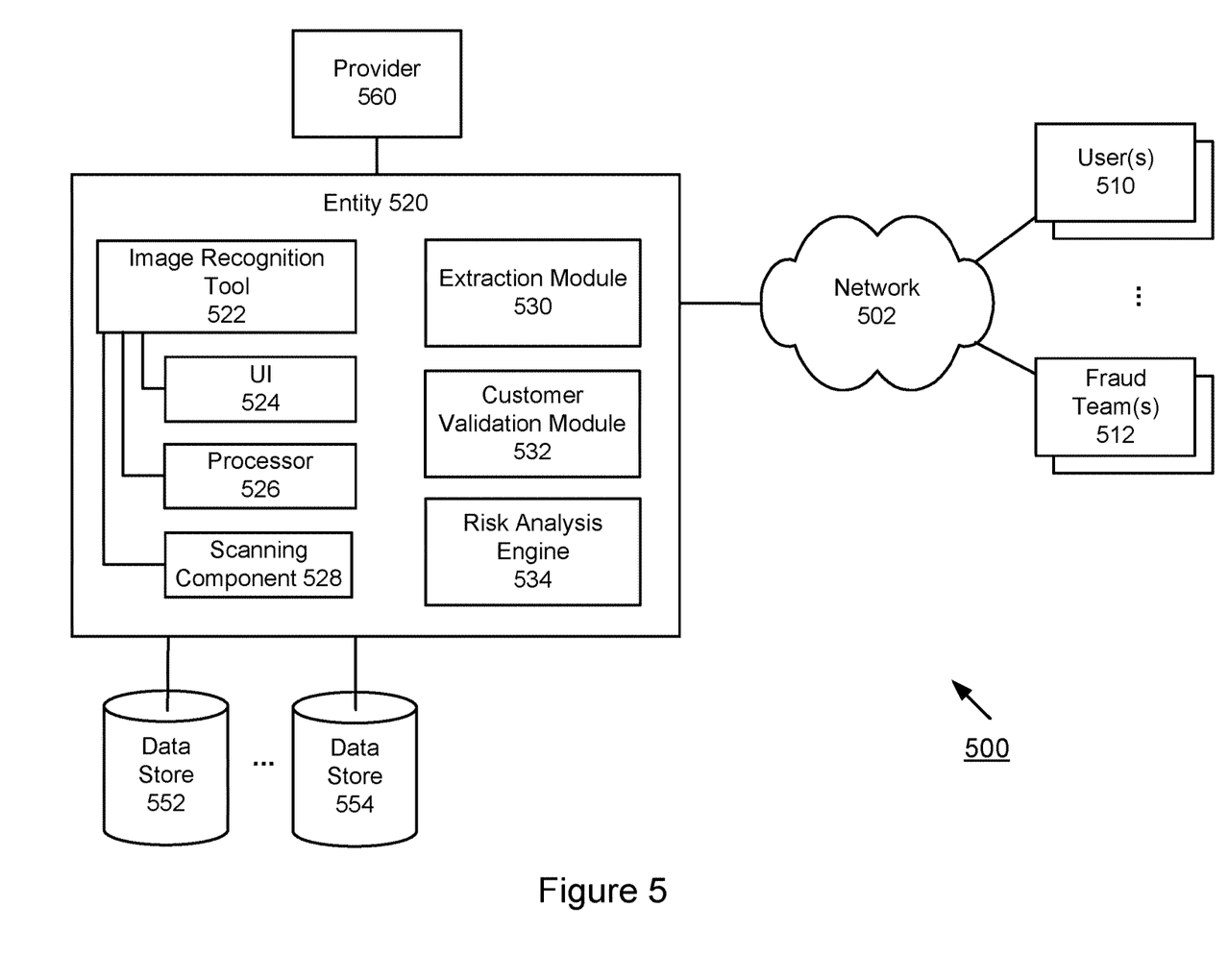
FIG. 5 is a system diagram, according to an embodiment of the present invention.

FIG. 5 is a system diagram, according to an embodiment of the present invention. As illustrated in FIG. 5, Network 502 may be communicatively coupled to Users 510, Fraud Teams 512, via computing devices. Computing devices may include computers, laptops, workstations, kiosks, terminals, tablets, mobile devices, mobile phones, smart devices, etc. Network 502 communicates with Entity 520 that performs image recognition and fraud analysis. Entity 520 may include an Image Recognition Tool 522 that analyzes images for potentially sensitive information. Image Recognition Tool 522 may be a standalone application. In addition, Image Recognition Tool 522 may be integrated with other systems, tools and/or platforms to provide enhanced fraud detection. For example, Image Recognition Tool 522 may be integrated with a keyword searching tool that seeks to identify potentially compromised accounts.

Image Recognition Tool 522 may also incorporate modules and other functions, such as User Interface (UI) 524, Processor 526 and Scanning Component 528. Other modules may include Extraction Module 530, Customer Validation Module 532 and Risk Analysis Engine 534. These modules are exemplary and illustrative, Image Recognition Tool 522 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Image Recognition Tool 522 may mitigate fraud and identify victims of fraudulent activity and submitters of customer-identified site vulnerabilities. By applying image recognition based on an entity logo, font and other unique formatting characteristics, an embodiment of the present invention may detect when images of customer screenshots and login pages are being posted and potentially exposed. For example, a true customer may share an image of an account regarding a site vulnerability. This may occur when a customer is seeking assistance from a public forum. However, in doing so, the customer also shares sensitive information that could be used for fraudulent purposes. For example, a customer may experience an authentication error where access to another customer's account is granted. The customer may post screenshots that include another customer's account information in an effort to seek assistance and a resolution from a forum, website, social media, customer service or other source. For example, the customer may post a screenshot of the compromised page to a social media website of a bank to seek assistance. However, this post and corresponding customer account information may be seen by other social media users.

According to another example, a bad actor may attempt to sell credentials and then use customer account images to evidence access to the customer's account information. This may include a screenshot of the customer's account page with sensitive information obscured. The image itself may serve as evidence or proof that the bad actor has access to a compromised account. Bad actors may post and share on criminal forums to sell and profit from compromised account information.

User Interface (UI) 524 may enable a user to communicate with the Image Recognition Tool via a network.

Processor 526 may execute a language processing feature to recognize text associated with an image. This may be used to determine context regarding the captured image.

Scanning Component 528 may scan one or more images that are attributable to an entity. Scanning Component 528 may represent a scanning device or other component that executes an algorithm or application to recognize an image. The images may be from various sources, including external forums, social media websites, etc. The images may include logo, fonts, layouts, format, color combination and/or other indicia that are specific to an entity, service provider, merchant, individual, organization, brand, etc.

Scanning Component 528 may also identify an embedded beacon token (e.g., QR code, web beacon, etc.) that is substantially undetectable or invisible. The token may be embedded within web pages, mobile applications, etc. When a screenshot is taken, the token is also captured in the screenshot. The embedded token may facilitate tracking down and identifying the compromised customer.

Extraction Module 530 may extract forum and post metadata details from the images. The forum may represent a source, social media platform, etc. The metadata details may include corresponding website or page, a date and time posted and poster identifier. In addition, Extraction Module 520 may extract information from the image including customer identifier (e.g., name, identifier, partial social security number, phone number, email address, address, etc.), account identifier, account balance and recent transactions.

Customer Validation Module 532 may determine whether the customer information is attributable to a valid customer. The images and/or extracted information may be paired with a customer associated with the entity. For example, this may involve identifying a banking customer associated with the identified account images. For example, an image may include a screenshot of an account page that includes various information including the last four numbers of the account, partial name or identifier, time/date stamp, current balance, last transactions, etc. An embodiment of the present invention may then associate the image and/or extracted information with a customer, client or other user. For example, an embodiment of the present invention may apply a combination of extracted information to identify a corresponding customer. The extracted information may include: the last four digits of the account, date range and/or time range and a balance amount with a variance (e.g., plus or minus $100). This may yield a single customer or a subset of customers. Additional filters and/or data points may be applied to identify a corresponding customer.

Risk Analysis Engine 534 may determine whether there is a fraud risk for the customer. Risk Analysis Engine 534 may also determine an appropriate mitigation response action. Various other risk analysis, decisioning and fraud determinations may be implemented.

Risk Analysis Engine 534 may communicate with a risk or fraud team. For example, a risk determination may be communicated to a line of business regarding a vulnerability. Risk Analysis Engine 534 may determine a remediation solution. This may involve resetting credentials, issuing a new card product or account, etc. For example, an embodiment of the present invention may block an online profile associated with the identified customer. The customer may then be authenticated so that the customer may reset their credentials. This prevents a bad actor from gaining access using prior account information.

According to an exemplary illustration, Image Recognition Tool 522 may identify victims of fraudulent activity through the use of embedded tokens in an electronic image or statement. For example, Image Recognition Tool 522 may identify an exposed online profile that relates to an electronic statement. Image Recognition Tool 522 may identify an embedded token in the electronic statement that indicates an associated fraud risk. By embedding an invisible watermark on segments of a client's online profile pertaining to their accounts, an embodiment of the present invention may detect the identity of an exposed customer when images of financial account screenshots and login pages are being posted. This may apply when a true customer is exposing a site vulnerability or if a bad actor is attempting to sell credentials.

Entity 530 may be communicatively coupled to data storage devices represented by Data stores 552, 554. Also, Data stores 552, 554 may also store and maintain images extracted from various sources, including external sites, various forums, social media websites, etc. Data stores 552, 554 may also managed extracted information from images, metadata, tokens, beacons, codes, etc. The image recognition and fraud analysis features herein may be provided by Entity 520 and/or a third party provider, represented by 560, where Provider 560 may operate with Entity 520.

The system 500 of FIG. 5 may be implemented in a variety of ways. Architecture within system 500 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 500 may be located on a single device or distributed across a plurality of devices including one or more centralized servers and one or more mobile units or end user devices. The architecture depicted in system 500 is meant to be exemplary and non-limiting. For example, while connections and relationships between the elements of system 500 is depicted, it should be appreciated that other connections and relationships are possible. The system 500 described below may be used to implement the various methods herein, by way of example. Various elements of the system 500 may be referenced in explaining the exemplary methods described herein.

Network 502 may be a wireless network, a wired network or any combination of wireless network and wired network. For example, Network 502 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 402 may support an Internet network, a wireless communication network, a cellular network, Bluetooth, or the like, or any combination thereof. Network 502 may further include one, or any number of the exemplary types of networks mentioned above operating as a stand-alone network or in cooperation with each other. Network 502 may utilize one or more protocols of one or more network elements to which it is communicatively coupled. Network 502 may translate to or from other protocols to one or more protocols of network devices. Although Network 502 is depicted as one network for simplicity, it should be appreciated that according to one or more embodiments, Network 502 may comprise a plurality of interconnected networks, such as, for example, a service provider network, the Internet, a cellular network, corporate networks, or even home networks, or any of the types of networks mentioned above.

Data may be transmitted and received via Network 502 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 5 illustrates individual devices or components, it should be appreciated that there may be several of such devices to carry out the various exemplary embodiments. Entity 530 may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with Entity 530.

Entity 530 may be communicatively coupled to Data Stores 552, 554 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 502, or communications may involve a direct connection between the various storage components and Entity 530, as depicted in FIG. 5. The storage components may also represent cloud or other network based storage.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements image recognition to identify fraudulent activity and customer-identified site vulnerabilities, the system comprising:
   a data store that manages a catalog of images extracted from one or more external sources; and
   an image recognition tool comprising a scanning component and a computer processor and further coupled to the data store and programmed to:
   scan, via the scanning component, one or more images that are attributable to an entity, wherein the one or more images comprise an embedded token that is substantially undetectable to a viewer;
   extract forum and post metadata details from the one or more images, wherein the metadata details comprises at least one from among: a corresponding website, date and time posted, and poster identifier;
   extract customer information by utilizing the embedded token, wherein the customer information comprises at least one from among: a customer identifier, account identifier, balance, and recent transaction;
   determine whether the customer information is attributable to a valid customer; and
   determine whether the embedded token indicates that there is a fraud risk for the customer.

2. The system of claim 1 wherein the embedded token comprises one or more of: a QR code and a web beacon.

3. The system of claim 1, wherein the one or more images are from one or more external forums.

4. The system of claim 1, wherein the one or more images are from one or more social media websites.

5. The system of claim 1, wherein the one or more images comprise logo, fonts and layouts that are specific to the entity.

6. The system of claim 1, wherein the image recognition tool is further programmed to:
   responsive to determining whether there is a fraud risk for the customer, determine a mitigation response action.

7. The system of claim 1, wherein the image recognition tool is further programmed to:
   apply natural language processing (NLP) to text associated with the one or more images to determine context regarding the scanned one or more images.

8. The system of claim 1, wherein a location of the embedded token is randomized.

9. A method that implements image recognition to identify fraudulent activity and customer-identified site vulnerabilities, the method comprising:

scanning, via an image recognition tool, one or more images that are attributable to an entity, wherein the one or more images comprise an embedded token that is substantially undetectable;

extracting forum and post metadata details from the one or more images, wherein the metadata details comprises at least one from among a corresponding website, date and time posted, and poster identifier;

extracting customer information by utilizing the embedded token, wherein the customer information comprises at least one from among: a customer identifier, account identifier, balance, and recent transaction;

determining whether the customer information is attributable to a valid customer; and determining whether the embedded token indicates that there is a fraud risk for the customer.

10. The system of claim 9, wherein the embedded token comprises one or more of: a QR code and a web beacon.

11. The system of claim 9, wherein the one or more images are from one or more external forums.

12. The system of claim 9; wherein the one or more images are from one or more social media websites.

13. The system of claim 9, wherein the one or more images comprise logo, fonts and layouts that are specific to the entity.

14. The system of claim 9, wherein the image recognition tool is further programmed to:

responsive to determining whether there is a fraud risk for the customer, determine a mitigation response action.

15. The system of claim 9, wherein the image recognition tool is further programmed to:

apply natural language processing (NLP) to text associated with the one or more images to determine context regarding the scanned one or more images.

16. The method of claim 9, wherein a location of the embedded token is randomized.

17. A system that implements a plurality of embedded tokens to identify victims of fraudulent activity and submitters of customer-identified site vulnerabilities, the system comprising:

a data store that manages tokens that track activity; and a computer processor, coupled to the data store, programmed to:

identify an exposed online profile;

identify a customer associated with the exposed online profile, wherein the exposed online profile relates to an electronic statement;

scan at least part of the electronic statement wherein the electronic statement comprises an embedded token that is substantially undetectable;

extract the embedded token from the at least part of the electronic statement wherein a location of the embedded token in the electronic statement is randomized; and based on the customer associated with the exposed online profile, determine an associated fraud risk.

18. The system of claim 17, wherein the embedded token comprises one or more of: a QR code and a web beacon.

19. The system of claim 17, wherein the electronic statement comprises a plurality of embedded tokens.

20. The system of claim 17, wherein each of the plurality of embedded tokens are located at different locations within the electronic statement.

* * * * *